United States Patent [19]

Cook

[11] Patent Number: 4,813,174

[45] Date of Patent: Mar. 21, 1989

[54] INSECT TRAP AND CONTAINER FOR OLFACTORY LURE

[75] Inventor: John M. Cook, Lafayette, Calif.

[73] Assignee: Dow Corning Corporation, Midland, Mich.

[21] Appl. No.: 124,486

[22] Filed: Nov. 20, 1987

[51] Int. Cl.[4] .............................................. A01M 1/02
[52] U.S. Cl. ....................................... 43/107; 43/114; 206/0.5; 220/324
[58] Field of Search ...................... 43/107, 114, 121; 206/0.5; 220/324

[56] References Cited

U.S. PATENT DOCUMENTS

| | | |
|---|---|---|
| 254,800 | 3/1882 | Cohen . |
| 958,678 | 5/1910 | Pollard . |
| 983,977 | 2/1911 | Lilge . |
| 995,280 | 6/1911 | Nemsey . |
| 1,103,656 | 7/1914 | Campbell . |
| 1,277,354 | 9/1918 | Arabian . |
| 1,360,127 | 11/1920 | McKay . |
| 1,672,576 | 6/1928 | Meyer . |
| 1,685,241 | 9/1928 | Northrup .............................. 43/107 |
| 1,858,087 | 5/1932 | Howard . |
| 1,865,713 | 7/1932 | Taylor . |
| 1,968,954 | 8/1934 | Metzger . |
| 2,193,492 | 3/1940 | Richardson . |
| 3,458,113 | 7/1969 | Swartzbaugh ...................... 220/324 |
| 3,552,632 | 1/1971 | Wilson ................................ 206/0.5 |
| 3,636,870 | 1/1972 | Arthur ................................ 220/324 |
| 3,643,371 | 2/1972 | Gordon . |
| 3,820,273 | 6/1974 | Novak . |
| 3,855,727 | 12/1974 | Canoy . |
| 3,987,577 | 10/1976 | Hardee . |
| 4,452,006 | 6/1984 | Steck et al. . |
| 4,551,941 | 11/1985 | Schneidmiller . |
| 4,642,936 | 2/1987 | Jobin et al. . |
| 4,662,103 | 5/1987 | Cheng . |

FOREIGN PATENT DOCUMENTS 232026 1/1960 Australia .............................. 206/0.5

Primary Examiner—Kurt Rowan
Attorney, Agent, or Firm—Steele, Gould & Fried

[57] ABSTRACT

A lure container for holding a scented lure in an insect trap includes a basket formed by spaced apart webs defining a volume of space for enclosing the lure. The volume is a truncated conical section and the basket has a wide opening at one end of the section. Attached to a top peripheral edge of the basket is a lid that is hinged along one section of the edge. The opposite edge has a tab that extends outwardly for mounting the basket in the trap. The basket and lid are both formed by spaced apart webs and ends of the webs of the lid extend into space in the webs of the basket, to block the opening and confine the lure. The lure container or basket is placed in the housing of an insect trap wherein the basket is spaced away from all of the interior walls of the trap by the tab extending from the peripheral edge of the basket.

18 Claims, 1 Drawing Sheet

INSECT TRAP AND CONTAINER FOR OLFACTORY LURE

BACKGROUND OF THE INVENTION

The present invention relates to the field of insect traps and particularly relates to a container defining a foraminous sub-enclosure within a trap, holding an olfactory lure for attracting insects to the trap.

Insects are trapped for various purposes such as to kill them, count them or trap them alive for testing or the like. Attractive scents and colors can be used for this purpose, relying upon instinctive urges of the insects to seek food or reproduction. Food scents and sexually attractive pheromones are released inside or adjacent a trap such that insects in the area are drawn to the trap. Traps are known and have been specifically configured, for example, to trap boll weevils, gypsy moths, Japanese beetles, Mediterranean fruit flys, and other insects. In some agricultural situations, traps are used on a very large scale, with large numbers being deployed over an area to be protected or monitored.

One of the more popular methods to trap the Mediterranean fruit fly, an insect that attacks citrus trees, is to use a pheromone lure to draw flys into a trap, where they die and can be counted. One form of such trap, called the Jackson trap or delta trap, is characterized by a tube of triangular cross section, and means for removing a wall to check for and remove dead flys. Currently, an attractant lure is placed on a dental wick that is attached to a metal holder disposed inside the trap. The wick is saturated with a prescribed amount of lure and placed in the trap. The lure preferably acts as an insecticide as well as an attractant, for killing or disabling the insects. Alternatively, a separate means for killing the insects can be provided. The trap must be re-baited from time to time when the lure's olfactory characteristic diminishes, for example when most of the volatile material carrying the scent evaporates and becomes dissipated.

In addition to wicks soaked with liquid, olfactory lures can take other forms. Similarly, different forms of traps can be used. Various insect traps, by reason of their physical shape, can have hanging attachments built into them or can integrally or by attachment include receptacles such as a dental wick holder as described above.

The holder must be fixed to the trap, or arranged to sit on a supporting surface, which complicates matters. Where a liquid or loose material lure is used, the lure must be carried in an upright container. Examples are shown, for example in U.S. Pat.No. 2,193,492-Richardson and U.S. Pat. No. 3,855,727-Cavoy. These patents disclose traps where a complex particular structure is employed for holding the lure in a trap and holding the lure in place. While it may be possible in a less complicated trap to simply put the lure on a supporting surface (e.g., the bottom), this has drawbacks. The trap cannot be tilted or inverted. Trap shapes are specifically designed to take advantage of instinctive behavior of insects (for example many insects always walk upwardly when they alight) and the lure location and path of air flow must be taken into account. Furthermore, where a large number of insects are to be trapped and killed, dead insects accumulate and interfere with air circulation around lure material if simply placed on the bottom of the trap. For these reasons, relatively complicated traps have been standard, with various chambers and complicated holders. Such complicated shapes are difficult or impossible to arrange inexpensively as needed to enable use of olfactory lure traps on a large scale.

One type of olfactory lure called Polytrap, manufactured by Wickhen Products, Inc., a division of Dow Corning Corporation, can be configured as a self-contained solid or tubular enclosed body that has a particular olfactory characteristic. This material permits olfactory lures, e.g., pheromone lures, to be made in a fairly large solid block, for example one or two grams, which is to be located in the trap. Solids are easier to handle than loose or liquid attractants, which must be held in a cup, pouch or other receptacle, for example closed by some sort of emitting membrane that controls release of the olfactory component. If the lure holder is embodied as a compound structure with an attendant shell, it would be helpful to build a hanging device on the compound structure and affix it in a manner that tolerates overturning of the trap, however, without substantial expense.

A benefit of using a Polytrap lure is that large amounts of active ingredients, such as one or two grams, are incorporated in this type of lure. The lure is a fairly large size and yet is a single polymer matrix type plug having no other physical members other than itself. The Polytrap lure emits attractant from all its exposed sides and need not have a wrapping or confining skin, net or like holder. The Polytrap lure needs to be held physically in place by a structure other than its own manufactured structure, preferably exposing the maximum possible area to air flow.

U.S. Pat. No. 4,642,936-Jobin et al shows a trap in which an attractive lure can be mounted immediately under a trap's top wall, by means of a cage-like cup that engages a complementary receptacle under the top wall. The cup is used with a pellet-type pheromone. The cage holds the lure above and clear of the area in which dead insects accumulate, but requires a particular mounting means. Due to the needed precision and complexity, this lure holder and trap combination is relatively more expensive than a single delta trap, preferably made of plastic, waxed cardstock or the like. The lure holder basket has no movable element for opening and closing the lure-holding space. The lure holder itself is specific to this trap and not generally useful for a variety of traps.

A variety of other holder and/or trap structures have screens or grids wholly or partly enclosing a bait or lure substance. U.S. Pat. No. 4,551,941-Schneidmiller has grid-like outer walls. A very open grid is disclosed in U.S. Pat. No. 254,800-Cohen. Screens shaped as cups are found in U.S. Pat. Nos. 983,977-Lilge and 995,280-Vernsey. U.S. Pat. No. 1,103,656-Campbell even uses a drawstring bag. These references do not employ a grid-like basket with an integrally hinged closure and tab mounting.

SUMMARY OF THE INVENTION

It is an object of the present invention to provide an inexpensive and generally useful container for an olfactory lure, especially for mounting in an insect trap.

It is a further object of the present invention to provide a container which facilitates omni-directional full surface emission of olfactory compositions emanating from a solid form lure.

It is an additional object of the present invention to provide a lure container that is easily opened and closed without significant handling of the olfactory lure itself.

It is another object of the present invention to provide a lure container that is an integral plastic basket.

It is a further object of the present invention to provide a convenient lure container with a mounting mechanism that spaces the entire container away from the sides of an insect trap, while depending on no particular structural features of the trap.

It is an additional object of the present invention to provide a lure container that can be refilled with a new lure without significant difficulty thereby enabling the trap and the lure container to be used many, many times.

These and other objects are accomplished by a lure container having an integral plastic basket formed by spaced apart webs defining a volume of space for the lure. The volume can be a truncated conical section and the basket has a wide opening at one end of the section. Attached to a top peripheral edge of the basket at the opening is a lid that is hinged at one or more points along the edge. The lid is also formed by spaced apart webs and is operable to block the opening of the volume. The lure container or basket is placed in the housing of an insect trap wherein the basket is spaced away from all of the interior walls of the trap by a tab extending from the peripheral edge of the basket.

BRIEF DESCRIPTION OF THE DRAWINGS

Further objects and advantages of the present invention can be found in the detailed description of the preferred embodiments when taken in conjunction with the accompanying drawings in which.

DETAILED DESCRIPTION OF THE PREFERRED EMBODIMENTS

The present invention relates to an olfactory lure container as well as an insect trap within which is mounted the lure container.

Figure 1:
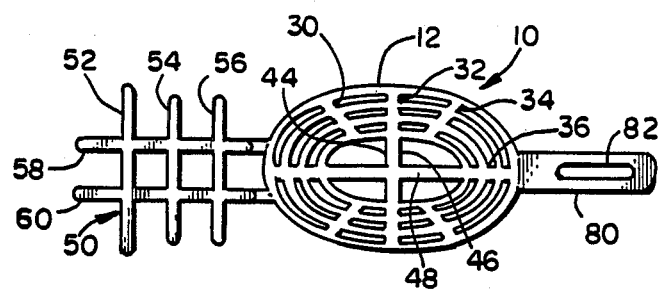
FIG. 1 illustrates a top view of the lure container shown fully open.
Figure 2:
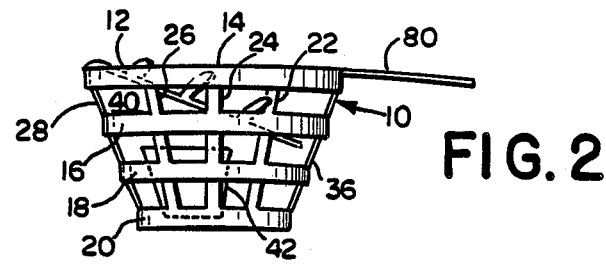
FIG. 2 illustrates a side view of the lure container with the lid blocking the opening of the container.

FIG. 1 illustrates a top view of lure container 10. The lure confining space in lure container 10 is defined by a basket 12 of spaced apart webs. FIG. 2 shows a side view of container 10. Horizontal webs 14, 16, 18 and 20 are connected to and spaced apart by vertical webs 22, 24, 26, 28, 30, 32, 34 and 36. Basket 12 defines a truncated conical volume section 40 within which is disposed an olfactory insect lure 42. This insect lure may be the Polytrap solid plug lure. The bottom 44 of basket 12 also includes cross webs 46 and 48, all the webs enclosing the volume 40 at sufficient spacing to prevent loss of lure 42 through the openings, but facilitating air circulation over all surfaces of lure 42.

The top peripheral edge defined by horizontal web 14 defines a wide opening for conical volume section 40. This opening can be closed by lid 50, formed by lateral webs 52, 54, 56 and longitudinal webs 58 and 60.

Figure 3:
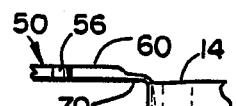
FIG. 3 is a partial, side view of the hinge section of the lid, disposed as shown in FIG. 1.

Lid 50 is hinged to the basket. The lid may be a separate part with webs looping around the top web 14 of the basket, forming a hinge. Preferably the lid is integral with the basket. FIG. 3 shows that longitudinal web 60 has a weakened section 70 that defines a hinge means attaching lid 50 to the opening defined by horizontal web 14.

FIG. 2 illustrates that lateral web 52 of lid 50 extends outboard beyond conical volume section 40, i.e., outboard of vertical web 22 of basket 12. Further, FIG. 2 shows that longitudinal webs 58 and 60 extend outboard of basket 12 beyond vertical web 36. This feature of the invention enables lid 50 when across the opening defined by horizontal web 14 to become locked in place by engagement of distal ends of the lid webs in openings between basket webs. When the lid is pushed downward to close the basket, the distal ends snap past web 14 into locked position, the lid deforming slightly in the process and resiliently returning to a substantially flat shape.

The web construction of basket 12 enables the olfactory attractant in lure 42 to be exposed to air circulation from all directions, i.e., emitting the scent omni-directionally with release of the volatile substance carrying the lure. Further, lid 50 can be easily opened and closed manually, enabling a person to secure lure 42 in the basket without physically touching the lure and eliminating contamination of the lure and/or application of the lure to the person's fingers, etc. This feature also enables a spent lure 42 to be removed from basket 12 by simply raising the lid 50 from the blocking position shown in FIG. 2.

The basket and the lid are made of plastic, preferably polypropylene. The basket and lid are preferably molded as an integral, one piece unit.

Figure 4:
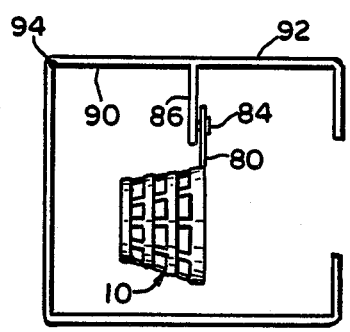
FIG. 4 is a schematic view of the lure container mounted in an insect trap and spaced away from the interior walls of the trap; and, FIG. 5 is a partially cut away view of a single Jackson trap showing mounting of the container.
Figure 5:
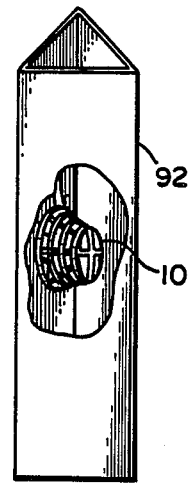

A tab 80 extends outboard from horizontal web 14 defining the opening of basket 12. Tab 80 includes an elongated hole 82 that is sized to fit a protrusion 84 (e.g., a hook as shown in FIG. 4). This can be part of a support member 86 depending from an interior wall 90 of an insect trap 92. Alternatively, the tab 80 can be fixed directly to a vertical wall as in FIG. 5. Insect trap 92 is only schematically shown and the lure holder of the invention is operable in a variety of traps, being particularly adapted to hold the scented lure material clear of the bottom and, preferably, sides of the trap 92.

The holder 10 can be mounted on an inner wall or under a lid of the trap 92. Insect trap 92 as in FIG. 4 can be opened by flexing a weakened section corner hinge at corner section 94. FIG. 4 shows that lure container 10 is mounted in such a way due to the interaction of tab 80 and trap structure 86 that the lure container is spaced from all interior walls of insect trap 92. Similar results are achieved by using tab 80 to space basket 10 from vertical inside walls. This spaced relationship ensures that air circulation to the lure held within container 10 is not reduced by too-close mounting to the interior walls of trap 92, which otherwise would reduce the efficiency of the insect trap. In a preferred embodiment, the tab is integral with basket 12.

Protrusion 84 can be any hook or pipn shaped to be complementary to elongated slot 82 in tab 80 such that basket 10 is securely mounted within trap 92. The protrusion 84 can be arranged with an enlarged distal end, which deforms elongated slot 82 when inserted. This locks tab 80 and protrusion 84 in the manner of a button in a buttonhole. Protrusion 84 can also be elongated such that lure container 10 is not only held but also oriented in a fixed position, within the enclosure of insect trap 92. The tab can be arranged to bend around from vertical at its end where attached to a vertical wall of the trap, to horizontal or downwardly-directed at the basket.

Lure container 10, in its preferred embodiment, is designed to fit the standard Jackson trap or "delta" trap. This standard trap, which is inexpensive and widely distributed, has an openable lid, preferably with a mounting tab for hanging the lure container via its tab 80.

The drawings generally depict the approximate size of the lure container. Field tests have shown that lure 42 can be placed in basket 12 by simply opening the packaging of the lure, opening lid 50 of basket 12, sliding the lure into the basket, and closing the lid 50 as shown in FIG. 2. This is a significant advance since the person handling the lure avoids touching the material of the lure, thereby eliminating contamination of the lure or contamination of the person handling the lure. When the lure is spent, the basket is easily opened and the lure dropped into a waste container without the person touching the lure itself. It will be appreciated that without this protection a person handling olfactory lures and traps tends to leave attractively scented and/or contaminated handprints on traps and in other places, with the result that scent emission is not localized where needed to best attract insects into the trap.

The fixed attachment and orientation of lure container 10 within insect trap 92 is important since the insect trap can be moved as necessary without having the lure within basket 12 touch the interior surfaces of trap 92. This is a significant factor to consider when an objective is accurate monitoring and comparison of insect population in certain areas by use of identical traps, baits and/or other lures. Since the basket becomes an integral part of the trap, the basket and the trap can be used many times notwithstanding the fact that the lure is eventually spent. According to the invention the lure can readily be replaced.

The claimed invention likewise includes certain modifications and changes to the general idea of a lure basket as disclosed. For example, the basket can be made in various stages and fused together. Instead of integral molding the horizontal webs could be made at one manufacturing stage and the vertical webs made at a second manufacturing stage and a bonding or fusion of the vertical and horizontal webs could be done as a third manufacturing stage. The size and the exact ovoid, truncated conical shape of the lure container is not meant to be limited to that shown in the figures. Also, the mechanism for affixing the lure container within the insect trap is not meant to be limited to that shown in the figures or described in the preferred embodiment. Persons skilled in the art will also realize certain other changes and modifications that do not depart from the invention concept. Reference should be made to the appended claims rather than the foregoing Specification as showing the true scope of the invention.

I claim:

1. A container for holding an olfactory lure, comprising:
a basket formed by spaced apart webs defining a volume for the lure, the basket having a peripheral top edge defining an opening for the volume;
a hinged lid on the basket, formed by spaced apart webs, including protruding ends, movable operable with respect to a portion of the basket to block said opening to the basket, said protruding ends of the spaced apart webs of the lid protruding through the spaced apart webs of the basket when the lid is moved to block said opening, the lid being fixed across the opening by engagement of the spaced apart webs of the lid and the basket, respectively.

2. The container of claim 1 wherein the lid and basket are integral structures.

3. The container of claim 1 wherein the lid is attached to the basket along hinge means including weakened sections of the spaced lid webs.

4. The container of claim 2 wherein the lid and basket are flexible plastic.

5. The container of claim 4 wherein the lid and basket are molded polypropylene.

6. The container of claim 1 wherein the basket has a flat bottom parallel to the peripheral edge and the basket forms a truncated conical volume with a wide opening.

7. The container of claim 5 further comprising an attachment means integral with the basket, the attachment means being a tab extending outboard from the basket and having means for mounting the tab disposed therein, the tab being operable to position the basket at a space from a surface to which the tab is mounted.

8. A container for holding an olfactory lure, comprising:
a basket formed by spaced apart webs defining a volume for the lure, the basket having a peripheral edge defining an opening for the volume;
a lid, integral with the basket, the lid and the basket being flexible molded polypropylene, the lid being formed by spaced apart webs, movably operable with respect to a portion of the basket to block said opening to the basket, a portion of the spaced aparat webs of the lid protruding through the spaced apart webs of the basket when the lid is moved to block said opening; and,
an attachment means integral with the basket, the attachment means being a tab extending outboard from the basket and having means for mounting the tab disposed therein, the tab being operable to position the basket at a space from a surface to which the tab is mounted, the tab being disposed along the peripheral edge of the basket substantially in a plane defined by the peripheral edge.

9. An insect trap comprising:
a housing including means defining a space for trapped insects;
a container for receiving an olfactory lure disposed in close proximity to the means defining a space for trapped insects such that insects visiting the olfactory lure become trapped in the housing, the container being an open mesh enclosure having a hinged lid and a basket, the lid and the basket being open mesh structures, the lid having protruding web ends and being movable operable to enclose the olfactory lure by engagement of the protruding web ends of the lid in the open mesh of the basket; and,
a spacing tab securely attached to the open mesh enclosure, the housing and the spacing tab each having engageable means for affixing the tab to the housing such that the open mesh enclosure is spaced from inner surfaces of the container for receiving the olfactory lure.

10. The trap of claim 9, wherein the container is disposed directly in the means defining a space for trapped insects, said means including a Jackson trap and wherein the spacing tab is operable to position the container above a floor of the Jackson trap.

11. The trap of claim 9 wherein the open mesh enclosure is molded plastic and is formed integrally with the spacing tab.

12. The trap of claim 11 wherein the open mesh enclosure includes an open mesh lid hingeably attached to an open mesh basket.

13. The trap of claim 12 wherein the lid is attached to the basket along weakened lengths defining preferential hinge points and the lid, basket and spacing tab are integral with one another.

14. The trap of claim 13 wherein the lid has protruding web ends extendig through spaces in the open mesh basket, whereby the lid is lockable in closed position on the basket.

15. The trap of claim 14 wherein the basket, lid and spacing tab are integrally molded flexible polypropylene.

16. An insect trap comprising:
a housing including means defining a space for trapped insects;
a container for receiving an olfactory lure disposed in close proximity to the means defining a space for trapped insects such that insects visiting the olfactory lure become trapped in the housing, the container being an open mesh enclosure having a lid movable operable to enclose the olfactory lure, the enclosure having an open mesh lid hingeably attached to an open mesh basket along weakened lengths defining preferential hinge points, protruding web ends of the lid extending through spaces in the open mesh basket, whereby the lid is lockable in closed position on the basket; and,
a spacing tab, with engageable means thereon for affixing the tab to the housing such that the open mesh enclosure is spaced from inner surfaces of the container for receiving the olfactory lure, the basket, lid and spacing tab being an integrally molded unit of flexible plastic, the spacing tab being operable to position the basket above a floor of the housing by means of an elongated slot in the spacing tab engageable with the housing.

17. The trap of claim 16 wherein the spacing tab engages a protrusion within the housing, the protrusion being complementarily elongated to fit the slot, whereby the enclosure is oriented at a fixed position within the enclosure.

18. An improved insect trap of the type having an elongated tube for accumulating trapped insects, the trap being a Jackson trap, the improvement comprising:
a lure mounting basket attached to an appendage on an inner side of the trap, the basket having a tab removably fixed to the trap and an open mesh construction, the basket having a mesh hinged lid affixed to the basket, the lid having free ends protruding through the open mesh construction of the basket to lock the lid closed, and the tab positioning the basket at a space from inner walls of said trap.

* * * * *

UNITED STATES PATENT AND TRADEMARK OFFICE
CERTIFICATE OF CORRECTION

PATENT NO. : 4,813,174

DATED : March 21, 1989

INVENTOR(S) : Cook

It is certified that error appears in the above-identified patent and that said Letters Patent is hereby corrected as shown below:

Column 4, line 61, "pipn" should be --pin--.
Column 5, line 57, "invention" should be --inventive--.
Column 5, line 67, "movable" should be --movably--.
Column 6, lines 35 and 36, "aparat" should be --apart--.
Column 6, line 57, "movable" should be --movably--.
Column 7, line 29, "movable" should be --movably--.

Signed and Sealed this

Thirtieth Day of April, 1991

Attest:

HARRY F. MANBECK, JR.

Attesting Officer

Commissioner of Patents and Trademarks